(12) United States Patent
Krebber et al.

(10) Patent No.: US 10,773,320 B2
(45) Date of Patent: Sep. 15, 2020

(54) SAWING MACHINE AND GUIDING DEVICE FOR A SAW BAND OR SAW BLADE OF A SAWING MACHINE

(71) Applicant: KEURO Besitz GmbH & Co. EDV-Dienstleistungs KG, Achern (DE)

(72) Inventors: Sonke Florian Krebber, Baden-Baden (DE); Armin Stolzer, Baden-Baden (DE)

(73) Assignee: KEURO BESITZ GMBH & CO. EDV-DIENSTLEISTUNGS KG, Achern (DE)

( * ) Notice: Subject to any disclaimer, the term of this patent is extended or adjusted under 35 U.S.C. 154(b) by 138 days.

(21) Appl. No.: 15/609,364

(22) Filed: May 31, 2017

(65) Prior Publication Data

US 2017/0368622 A1    Dec. 28, 2017

(30) Foreign Application Priority Data

Jun. 23, 2016 (DE) .................. 10 2016 111 545

(51) Int. Cl.
| | | |
|---|---|---|
| *B23D 55/00* | (2006.01) | |
| *B23D 47/00* | (2006.01) | |
| *B23D 55/08* | (2006.01) | |
| *B27B 5/38* | (2006.01) | |

(52) U.S. Cl.
CPC ......... *B23D 55/005* (2013.01); *B23D 47/005* (2013.01); *B23D 55/082* (2013.01); *B23D 55/084* (2013.01); *B23D 55/086* (2013.01); *B27B 5/38* (2013.01)

(58) Field of Classification Search
CPC ............ Y10T 83/7264; Y10T 83/7226; B23D 55/082; B23D 55/005; B23D 55/084; B23D 55/086; B23D 55/00; B23D 47/005; B27B 5/38
See application file for complete search history.

(56) References Cited

U.S. PATENT DOCUMENTS

| | | | | |
|---|---|---|---|---|
| 3,563,285 A | * | 2/1971 | Thrasher ................ | B23D 55/10 83/818 |
| 3,674,065 A | | 7/1972 | Fairfield, Jr. et al. | |
| 3,991,644 A | * | 11/1976 | Sugimoto ............ | B23D 55/088 83/800 |

(Continued)

FOREIGN PATENT DOCUMENTS

| | | |
|---|---|---|
| DE | 2803357 | 8/1978 |
| DE | 3004091 | 10/1987 |

(Continued)

*Primary Examiner* — Phong H Nguyen

(74) *Attorney, Agent, or Firm* — Volpe and Koenig, P.C.

(57) ABSTRACT

A guiding device for a saw band or a sawblade of a sawing machine is provided, which has at least one holder with at least one gliding part and/or at least one roll for an at least temporary gliding and/or rolling contact with the saw band or sawblade. The at least one gliding part and/or the at least one roll is provided on the holder in a movable fashion in reference to the holder, with the at least one gliding part and/or the at least one roll being movable in reference to the holder via at least one piezo-actuator, essentially perpendicular to the direction of movement of the saw band or sawblade. A sawing machine with such a guiding device is also provided.

9 Claims, 5 Drawing Sheets

(56) References Cited

U.S. PATENT DOCUMENTS

| | | | |
|---|---|---|---|
| 4,237,757 A * | 12/1980 | Bonac | B23D 55/084 |
| | | | 83/74 |
| 4,290,330 A | 9/1981 | Washio et al. | |
| 4,336,731 A * | 6/1982 | Eklund | B23D 53/00 |
| | | | 83/74 |
| 4,342,241 A | 8/1982 | Eklung | |
| 4,766,790 A | 8/1988 | Harris | |
| 6,202,528 B1 * | 3/2001 | Morgan | B23D 55/082 |
| | | | 83/820 |
| 6,779,427 B2 | 8/2004 | Stolzer | |
| 7,127,978 B2 | 10/2006 | Boss et al. | |
| 2004/0011224 A1 * | 1/2004 | Weber | B26D 7/01 |
| | | | 99/537 |
| 2005/0109174 A1 * | 5/2005 | Claesson | B23B 27/002 |
| | | | 82/1.11 |
| 2009/0165621 A1 * | 7/2009 | Tzschentke | B23Q 1/34 |
| | | | 83/370 |
| 2015/0090086 A1 | 4/2015 | Winkler et al. | |
| 2015/0158097 A1 | 6/2015 | Myrfield | |

FOREIGN PATENT DOCUMENTS

| | | |
|---|---|---|
| DE | 19653242 | 6/1998 |
| DE | 19828589 | 12/1999 |
| DE | 102010048638 | 1/2012 |
| DE | 102011050189 | 11/2012 |
| DE | 102015115946 | 3/2017 |
| EP | 0456223 | 5/1991 |
| EP | 1466688 | 10/2004 |
| EP | 2 492 036 A1 | 8/2012 |
| SU | 923804 | 4/1982 |

* cited by examiner

SAWING MACHINE AND GUIDING DEVICE FOR A SAW BAND OR SAW BLADE OF A SAWING MACHINE

INCORPORATION BY REFERENCE

The following documents are incorporated herein by reference as if fully set forth: German Patent Application No. 102016111545.2, filed Jun. 23, 2016.

BACKGROUND

The present invention relates to a guiding device for a saw band or saw blade of a sawing machine, as well as a sawing machine comprising such a guiding device.

Such a sawing machine is particularly provided for sawing metal and/or mineral materials as well as composites and comprises a sawing tool, which can be moved in reference to the workpiece for a sawing feed. For this purpose the sawing machine is driven in a circumferential sawing motion in order to ensure the machining function of the sawing tool inside the workpiece. The workpiece is here usually clamped onto a machine table.

If the sawing machine is a traveling saw band and thus the sawing machine is a band saw machine, the sawing tool and/or the saw band is commonly provided in a linear and/or pivotally mobile machine top and travels here usually about at least two deflecting rolls, with at least one of them being driven. If the sawing machines represents however a circular sawing machine, the sawing tool is embodied as a sawblade which commonly is supported in a pivotally or linearly displaceable arm and rotates thereon.

In circular sawing machines, the sawblade represents the most instable component, particularly since the sawblade is embodied as narrowly as possible in order to machine as little material as possible during the sawing process. Simultaneously it is desired that the saw cut is true to size within tolerances as narrow as possible, which particularly at higher cutting speeds leads to a conflict of goals with the framework condition to use a saw blade as thin as possible.

Sawblades tend to draw in a diagonal direction during the sawing process, particularly with increasing wear and tear. Additionally, the machining of the material of the workpiece generates oscillations in the sawblade, which can lead to an imprecisely saw cut.

As known for example from EP-A-1 466 688 it is therefore common to guide the two lateral areas of the sawblade of a circular sawing machine in the proximity of the saw teeth via a guiding device in order to prevent the diagonal pull and to damp any oscillating motions. This guide device comprises front and rear sawblade guides, which are respectively provided with gliding parts made from hard metal or ceramic and guide the sawblade between each other.

In band saw machines, which have a band saw traveling over at least two driving and/or deflecting rolls, with the axes of rotation thereof usually being perpendicular in reference to the plane of the sawed cut or oriented inclined in reference thereto, it is necessary to rotate the saw band prior to entering the workpiece to be sawed as well as after leaving it into the plane of the sawed cut and/or to rotate it back out of this plane into the traveling position. This occurs usually via a guiding device, which commonly comprises two holders embodied like pliers, which are arranged upstream in reference to the entry of the saw band into the workpiece and downstream the exit from said workpiece. Gliding parts made from hard metal or ceramics are arranged in these plier-like holders at both sides of the saw band, which ensure lateral band guidance, while the back of the saw band is frequently guided over rolls and/or also over gliding parts. An example for such a guiding device is disclosed in DE-A-198 28 589.

In addition to the deflection of the saw band, which is perhaps not necessary depending on the type of band saw machine, guiding devices in band saw machines serve the particular purpose of preventing the distortion of the saw band and a lateral tilting of the saw band caused by the cutting pressure as well as to damp any oscillations of the saw band, because such deflecting motions and oscillations in turn endanger that the sawed cut is true to size.

The guiding devices of the present type, regardless if they are provided for a circular sawing machine or a band saw machine, have therefore in common that they comprise at least one holder with at least one gliding part and/or at least one roll for at least a temporary gliding and/or rolling contact with the saw band or the sawblade.

In particular at high machining speeds it has shown that conventional guiding devices fail to lead to optimal results in all applications both for a saw band of a band saw machine as well as a sawblade of a circular sawing machine with regards to damping oscillations of the saw band or the sawblade.

BACKGROUND

The present invention is therefore based on the objective of providing a guiding device of the type mentioned at the outset as well as a sawing machine comprising such a guiding device, by which oscillations in the saw band or the sawblade can be damped more effectively.

This objective is attained in a guiding device as well as a sawing machine having one or more of the features of the invention.

Preferred embodiments and further developments of the guiding device according to the invention as well as the sawing machine according to the invention are provided below and in the claims.

According to the invention it is therefore provided that at least one gliding part and/or at least one roll are provided at the holder in a fashion movable in reference to the holder, namely preferably essentially perpendicular in reference to a direction of travel of the saw band or the sawblade, i.e. thus essentially in a manner movable towards the saw band or the sawblade and away therefrom. This movement is triggered according to the invention by at last one Piezo-actuator.

Piezo-actuators include piezo-electric materials, such as quartz or barium titanate, for example, and utilize the piezo-electric effect by which a deformation of the crystalline structure of the piezo-electric material occurs by an electric voltage being applied. This way, piezo-actuators can generate strong mechanic forces and here deform in a very short period such that by an appropriate modulation of the applied voltage oscillations are generated with frequencies in the kHz-range.

This feature of the piezo-actuators used according to the invention allows to actively damp oscillations in the saw band or the sawblade, which compromise the sawing result. Here it is preferred that a control unit for controlling and/or regulating the motions of at least one piezo-actuator is a part of the guiding device according to the invention, which comprises for example a set of different control programs for controlling at least one piezo-actuator. Based on saw parameters to be entered in the control unit, such as the profile and material of the workpiece to be sawed, or the form and the material as well as the speed of motion of the saw band or the sawblade or also the speed of the sawing feed a control program is selected that generates motions, particularly counter-oscillating motions of the piezo-actuator, in order to counteract and/or to damp vibrating motions of the saw band or the sawblade typically developing when sawing with respective sawing parameters.

The optimized, active damping of vibrations can be achieved within the scope of a preferred embodiment of the guiding device according to the invention by evaluating signals from a sensor, which detects oscillating motions of the saw band or the sawblade. With the help of an appropriate algorithm the control unit can calculate from the detected oscillating motions of the saw band and/or the sawblade counter-oscillating motions and generate them with the piezo-actuator according to the invention, ensuring an optimized active damping of oscillations.

Such a sensor for detecting oscillating motions of the saw band or sawblade can be a solid borne sound sensor or an optical vibration sensor; however, at least one or an additional piezo-actuator may be used as a sensor for detecting oscillating motions, because the piezo-electric effect works in both directions: Any deformation of the piezo-electric materials leads to a change of the voltage applied and vice versa.

The control unit of the guiding device, which based on sensor signals generates counter oscillation motions of at least one piezo-actuator in order to optimize an active oscillation damping, can also be equipped with a self-learning algorithm which uses the sensor signals as a control of success and adjusts the counter-oscillating motions respectively in a self-learning fashion.

If several piezo-actuators are provided in the holder of the guiding device according to the invention (which will usually be the case) it may be advantageous to embody the control unit such that it controls the different piezo-actuators in various fashions. Depending on the oscillation behavior of the saw band or the sawblade this may serve for optimizing the active damping of vibrations.

At least one piezo-actuator provided according to the invention is preferably arranged directly or indirectly between the gliding part and/or the roll and the holder. Here it may be advantageous to allow the piezo-actuator to act via a lever arrangement upon the gliding part and/or the roll. By a lever arrangement the deformation and/or the adjustment path of the piezo-actuator can be transmitted and thus increased and the piezo-actuator can be arranged at a certain distance from the saw band or the sawblade, which can simplify its electric contacting.

For the lateral guidance of the saw band or sawblade usually gliding parts are provided, which can be moved via the piezo-actuator actively towards the saw band and/or the sawblade and away therefrom. For the protection of the piezo-actuator it is here preferred for the gliding parts to be arranged on pressure plates, which can be moved in reference to the holder. The piezo-actuators can then be arranged between the pressure plates and the holder, in order to move the pressure plate, while simultaneously they are shielded by the pressure plate from the saw band and/or the sawblade.

For the guidance of the back of the saw band in a band saw machine it is preferred to use a roll, which is held in bearings, which are directly or indirectly movable via at least one piezo-actuator in reference to the holder. Such bearings may for example be arranged in a forked bearing bridge, which is connected via piezo-actuators to the holder, with the bearing bridge in turn shielding the piezo-actuators from the saw band.

In addition to the mobility of the gliding parts and/or rolls of a guiding device according to the invention via piezo-actuators according to the invention, within the scope of the present invention here a hydraulic mobility of the gliding parts and/or rolls may be provided as well.

BRIEF DESCRIPTION OF THE DRAWINGS

In the following, exemplary embodiments for the components essential for the invention of a guiding device embodied according to the invention are described in greater detail and explained based on the attached drawing. Shown are.

DETAILED DESCRIPTION OF THE PREFERRED EMBODIMENTS

Figure 1:
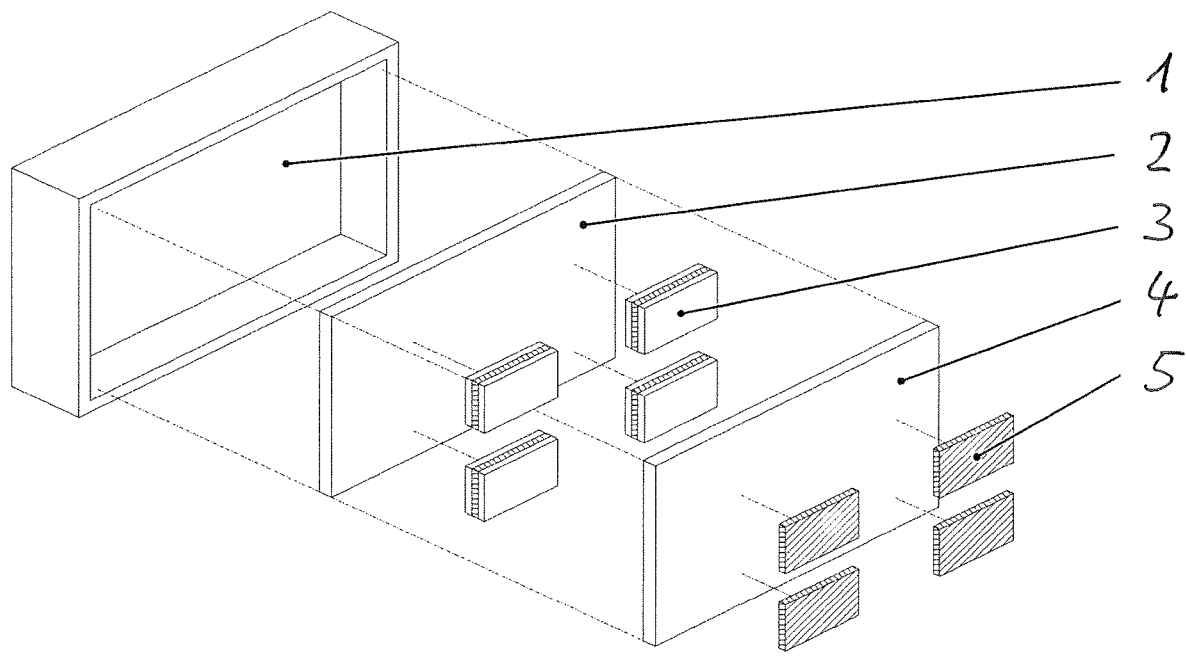
FIG. 1 a schematic exploded illustration of a lateral guidance of a saw band.

In the schematic exploded illustration according to FIG. 1 the essential elements are shown of a first exemplary embodiment of a lateral band guide designed according to the invention for a saw band of a band saw machine. It comprises a holder 1, a counter pressure plate 2, four piezo-actuators 3, a pressure plate 4, and four glide parts 5.

The glide parts 5 are connected fixed to the pressure plate 4 and they at least temporarily come into a gliding contact with the saw band (not shown here). They are made from hard metal plates. The pressure plate 4, on which the gliding parts 5 rest, is movable in reference to the holder 1 in order to move the gliding part 5 into abutting contact with the saw band and to allow distancing it therefrom and/or to perform an active vibration damping.

On the one side, the piezo-actuators are mounted fixed at the pressure plate 4 and on the other side, they are connected fixed to the counter pressure plate 2. The counter pressure plate 2 rests here locally fixed in the holder 1, while the pressure plate 4 is not connected to the holder 1, so that the piezo-actuators alter the distance between the counter pressure plate 2 and the pressure plate 4 as a function of a voltage applied (FIGS. 2 and 3).

The piezo-actuators 3 can be encapsulated for example by a circumferential O-ring seal between the counter pressure plate 2 and the pressure plate 4 such that they are not compromised by the environment of the saw band and particularly any cooling-lubricating emulsion commonly used. The electric contacting can here occur through the counter-pressure plate 2. The pressure plate 4 simultaneously shields the piezo-actuators 3 mechanically from the saw band. The holder 1 shows the form of a housing, which is essentially closed by the pressure plate 4 serving as a lid, so that this way too a protective effect results for the piezo-actuators 3.

Due to the fact that the present exemplary embodiment shows four spatially distributed piezo-actuators 3, they may perhaps also be addressed differently in order to generate many various counter-oscillating motions of the counter pressure plate 2 and thus of the gliding parts 5. If the counter pressure plate 2 is fastened in the holder 1 in a detachable fashion the counter pressure plate 2, the pressure plate 4, the piezo-actuators 3, and the gliding parts 5 can be exchanged as a module.

Figure 2:
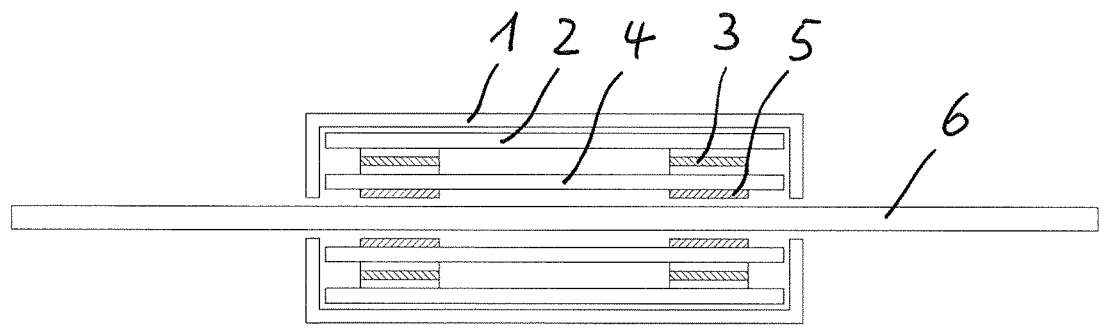
FIG. 2 a cross-section in a top view of a saw band with two lateral band guides according to FIG. 1, in the idle position.
Figure 3:
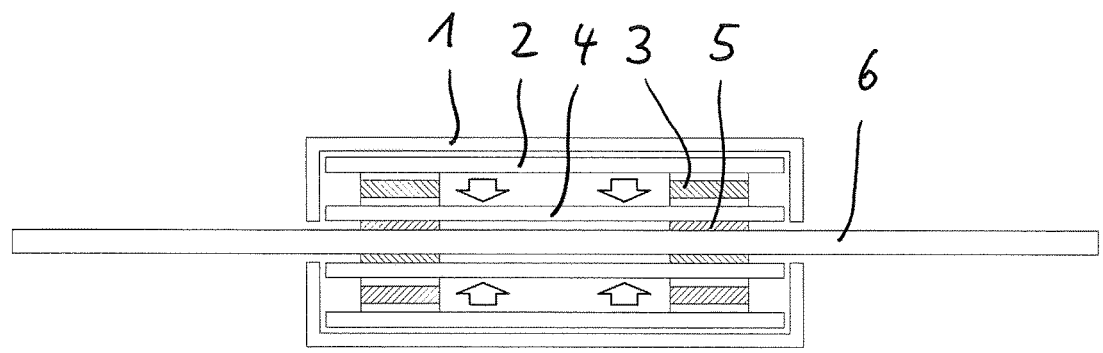
FIG. 3 an illustration according to FIG. 2, however in an engaged position of the band guides.

FIGS. 2 and 3 show the functionality of the guide shown in FIG. 1, with respectively a saw band 6 being shown in a cross-section, with its two sides respectively being provided with a guide of FIG. 1.

In FIG. 2 a voltage is applied to the piezo-actuators 3, by which the distance between the counter pressure plate 2 and the pressure plate 4 is minimal so that the gliding parts 5 fastened on the pressure plate 4 are separated from the saw band 6, thus keep a certain distance therefrom. Here it is clearly discernible that the piezo-actuators 3 are shielded by the holder 1 and the pressure plate 4 from the saw band 6.

In FIG. 3 the voltage applied to the piezo-actuators 3 is altered such that it deforms and increases the distance between the counter pressure plate 2 and the pressure plate 4 (arrows). This leads to the gliding parts 5 coming into contact with the saw band 6 and guide it via a gliding contact. The piezo-actuators 3 can also be addressed to generate a counter oscillating motion in order to actively damp potential vibrations of the saw band 6.

Figure 4:
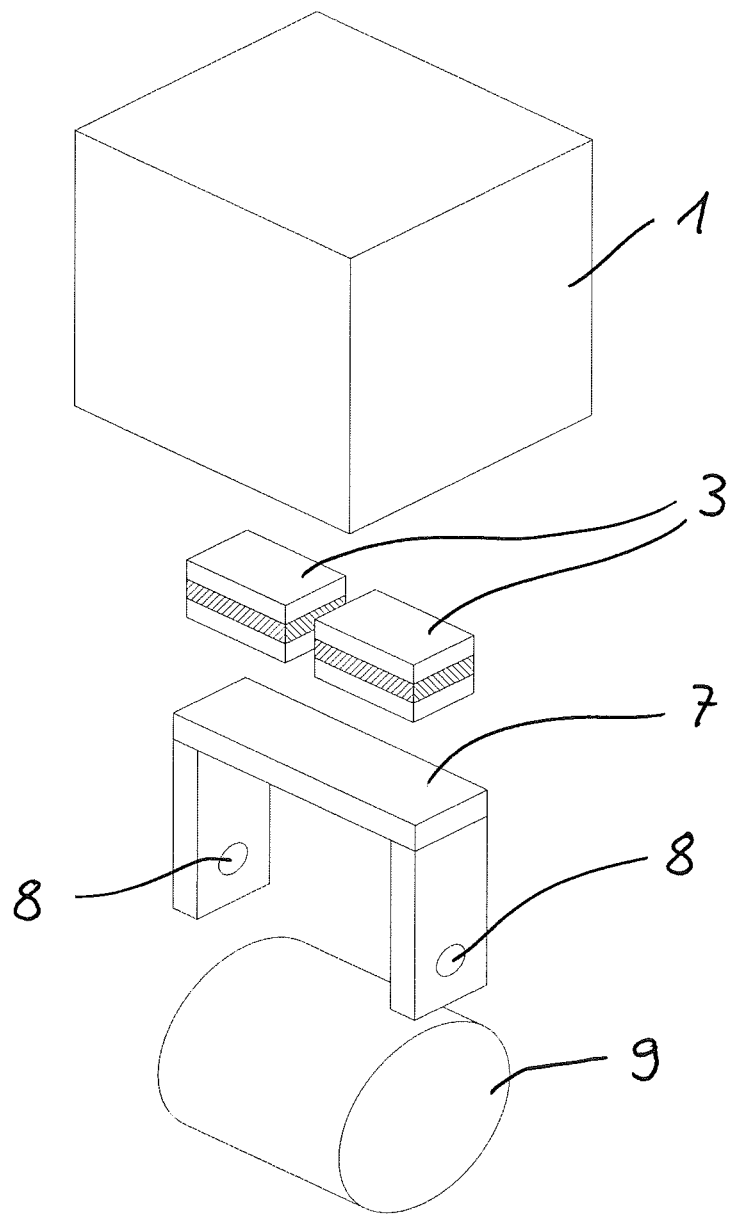
FIG. 4 a schematic exploded illustration of a back guide for a saw band.

FIG. 4 shows in turn a schematic exploded illustration, with the second exemplary embodiment disclosing a rear guide for a saw band (not shown here either). This back guide comprises in its essential parts a holder 1, in the present case embodied showing almost the form of a cube, which is open towards the bottom, two piezo-actuators 3, a bearing bridge 7 with the bearings 8, and a roll 9 in which the bearings 8 rest.

On the one side, the piezo-actuators 3 are connected fixed to the back of the bearing bridge 7 and on the other side fastened inside the holder 1 such that a piezo-electric alteration of the form of the piezo-actuators 3 leads to a relative motion of the bearing bridge 7 and thus also the roll 9 towards the holder 1.

Figure 5:
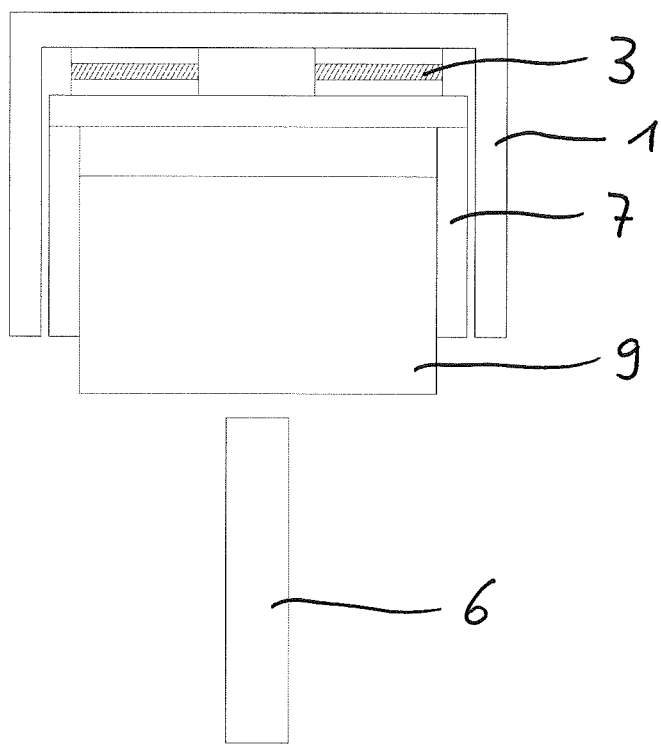
FIG. 5 a schematic cross-section of the back guidance of FIG. 4 in the idle position.
Figure 6:
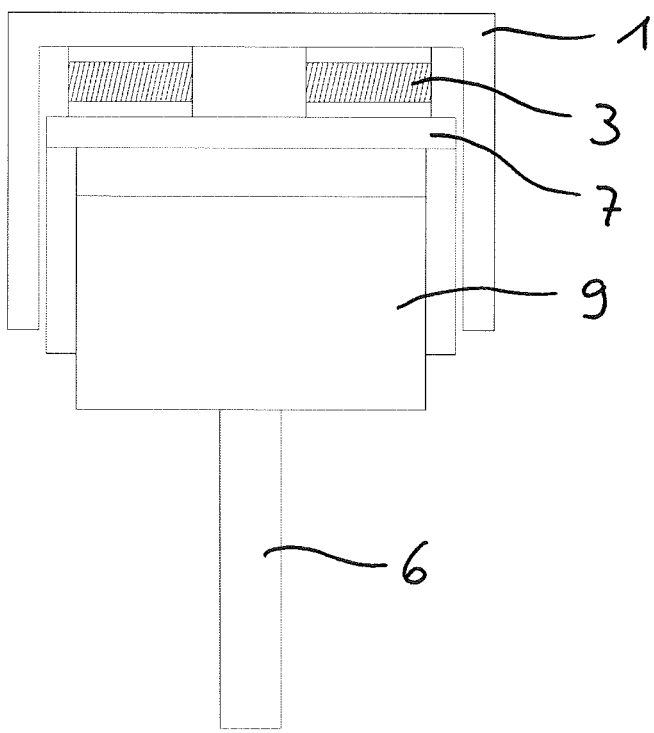
FIG. 6 an illustration similar to FIG. 5, however in the engaged position.

This way the roll 9 can be made to contact the saw band 6 and be distanced therefrom, which is illustrated based on the cross-sections in FIGS. 5 and 6. In FIG. 5 in turn a voltage is applied to the piezo-actuators 3, which leads to a minimal distance between the bearing bridge 7 and the holder 1, while in FIG. 6 a voltage is applied to the piezo-actuators 3 which increases this distance and thus allows the roll 9 to contact the back of the saw band 6 such that the roll 9 is here in a rolling contact with the saw band 6.

FIGS. 5 and 6 illustrate that the piezo-actuators 3 are mechanically shielded from the saw band 6 on the one side by the bearing bridge 7 and on the other side by the holder 1 and can perhaps be encapsulated. By a rapid change of the voltage applied to the piezo-actuators 3 here counter vibrations of the bearing bridge 7 and thus the roll 9 can be generated in order to actively damp the vibrations of the saw band 6. Here, perhaps the two piezo-actuators 3 can be controlled differently.

Figure 7:
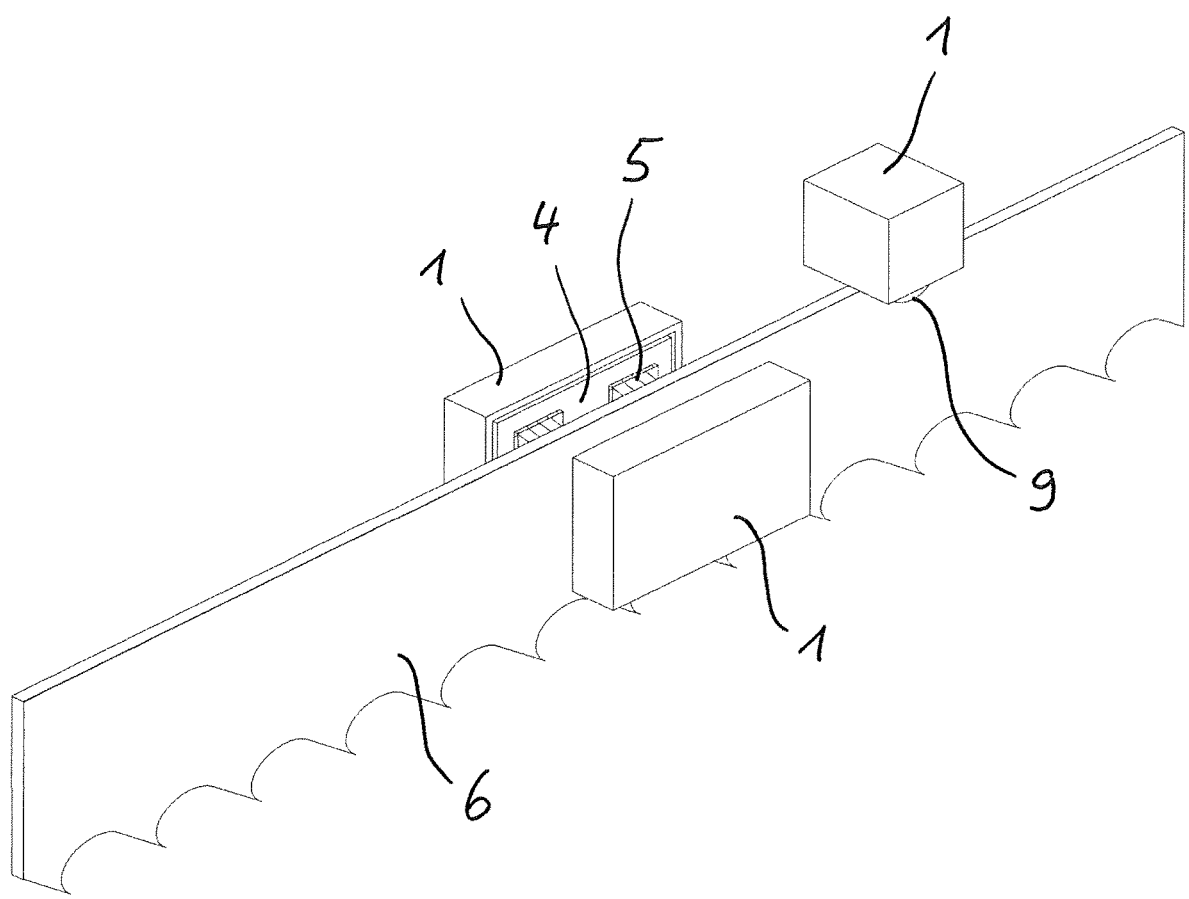
FIG. 7 a schematic perspective illustration of a guiding device for a saw band, comprising two lateral band guides and a back guide according to the previous figures.

FIG. 7 shows a perspective, schematic illustration of a saw band 6 of a sawing machine (not shown in greater detail), with the parts shown in the previous figures of a guiding device embodied according to the invention on the one side being used for a lateral guidance of the saw band 6 and on the other side for the rear guidance. From the lateral guides the holder 1, the pressure plate 4, and the gliding parts 5 are visible; the piezo-actuators 3 are encased by the holder 1 and the pressure plate 4. The piezo-actuators included in the rear guidance are not visible in this illustration but only the holder 1 and the roll 9, which rolls on the back of the saw band 6 and guides it.

Figure 8:
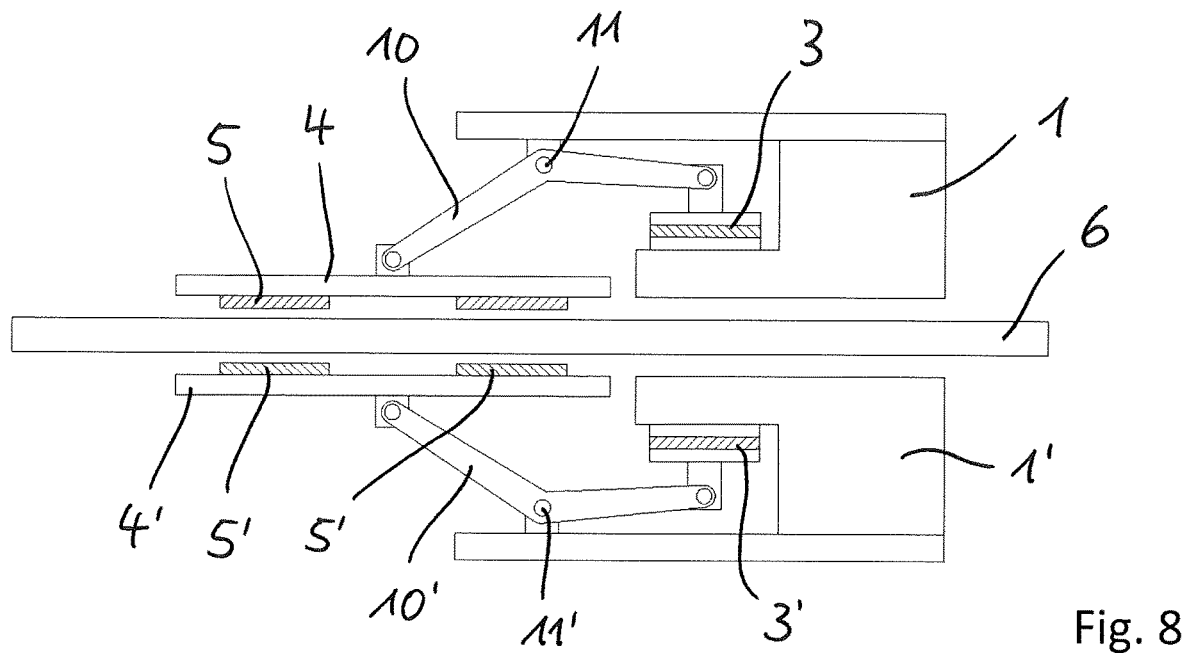
FIG. 8 a cross-section in a top view of a saw band with two lateral band guides according to another exemplary embodiment in the idle position.
Figure 9:
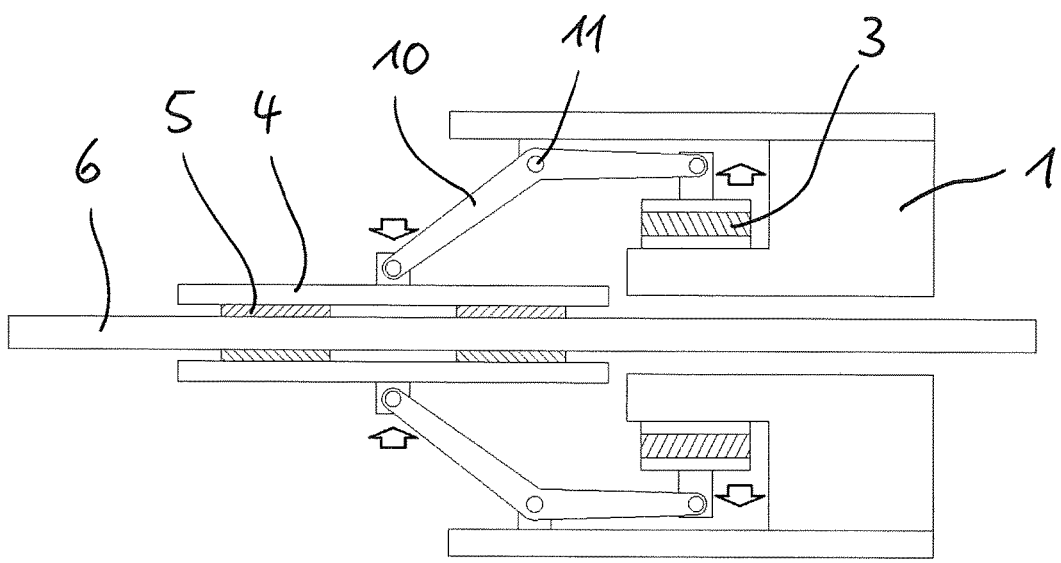
FIG. 9 an illustration similar to FIG. 8, however in the engaged position of the band guides.

FIGS. 8 and 9 show once more, similar to FIGS. 2 and 3, a top view of a saw band 6, with its two sides respectively being guided by a guide system embodied according to the invention. These guides differ from the ones shown in the previous figures and they embody a different exemplary embodiment of the present invention:

In this exemplary embodiment, shown in FIGS. 8 and 9, the gliding parts 5, 5' of the two guides are again arranged on a pressure plate 4, 4'. However, the piezo-actuators 3, 3' are fastened on the holder 1, 1' spaced apart from the gliding parts 5, 5' and the pressure plates 4, 4' and act via a lever arrangement 10 upon the pressure plates 4, 4' and the gliding parts 5, 5'. The lever arrangement 10 is fastened pivotally like a rocker via a rotational link 11 at the holder 1, with the lever arms on the one side being connected in an articulate fashion to the piezo-actuators 3 and on the other side to the pressure plate 4, also in an articulate fashion.

FIG. 8 shows the shut-off position and/or resting position of the guide system. Here a voltage is applied to the piezo-actuators 3 such that they have minimal thickness and thus cause via the lever arrangement 10 that the pressure plate 4 and thus the gliding parts 5 fastened thereon are lifted off the saw band 6.

In FIG. 9 the voltage applied to the piezo-actuators 3 is altered such that they have deformed. This way, the lever arrangement 10 was moved (arrows) and the pressure plate 4 and/or the gliding parts 5 fastened thereon are made to contact the saw band 6 in order to guide it in a gliding contact.

By the lever arrangement 10 the piezo-actuators 3 and thus also their electric contacting are spaced apart from the saw band 6 and the gliding parts 5 as well as the lubrication generally required by a cooling-lubricating emulsion. The piezo-actuators 3 are therefore advantageously not subjected to the rough environment of the saw band 6 and the gliding parts 5.

The invention claimed is:

1. A guiding device for a sawband or a sawblade of a sawing machine, comprising at least one holder (1) with at least one gliding part (5), at least one roll (9), or at least one gliding part (5) and at least one roll (9), for at least a temporary gliding, rolling, or gliding and rolling contact with a sawband (6) or a sawblade, at least one of the at least one gliding part (5) or the at least one roll (9) is fastened to the holder (1) in a manner movable in reference to the holder (1), with the at least one of the at least one gliding part (5) or the at least one roll (9) being movable via at least one piezo-actuator (3) in reference to the holder (1), at least one sensor for detecting vibrating motions of the sawband (6) or the sawblade, a control unit for at least one of controlling or regulating the motions of the at least one piezo-actuator (3), and the control unit is embodied such that based on signals of the at least one sensor, counter vibration movements of the at least one piezo-actuator (3) are generated in order to counteract or damp any vibrating motions of the sawband (6) or sawblade developing during the sawing process, and the at least one piezo-actuator (3) is also configured to function as the at least one sensor for detecting vibrating motions of the sawband (6) or the sawblade.

2. The guiding device according to claim 1, wherein the at least one piezo-actuator (3) is arranged directly or indirectly between at least one of the at least one gliding part (5) or the at least one roll (9) and the holder (1).

3. The guiding device according to claim 1, wherein the at least one piezo-actuator (3) acts via a lever arrangement (10) upon at least one of the at least one gliding part (5) or the at least one roll (9).

4. The guiding device according to claim 1, further comprising a pressure plate (4) provided in the holder (1) for at least one side of the sawband (6) or the sawblade, the pressure plate being movable relative to the holder (1), and the at least one gliding part (5) is fastened to the pressure plate for at least a temporary gliding contact with the sawband (6) or the sawblade, with the pressure plate (4) being fastened to the holder (1) via the at least one piezo-actuators (3).

5. The guiding device according to claim 1, wherein the guiding device is adapted for use with the sawband (6) and further comprises a fastener (1), which is provided with bearings (8) for the roll (9) for at least a temporary rolling contact with a back of the sawband, and the bearings (8) being movable in reference to the holder (1) directly or indirectly via the at least one piezo-actuator (3).

6. The guiding device according to claim 1, wherein the at least one sensor is embodied as at least one of a solid borne sound sensor or as an optic vibration sensor.

7. The guiding device according to claim 1, wherein several of the piezo-actuators (3) are provided and the control unit is embodied to control the piezo-actuators (3) differently.

8. The guiding device according to claim 1, further comprising a hydraulic movability being provided for at least one of the at least one gliding part (5) or the at least one roll (9).

9. The sawing machine for sawing at least one of metal or mineral workpieces, comprising a sawband (6) or sawblade, driven to circulate for a sawing process and movable in reference to a workpiece, and comprising the guiding device according to claim 1.

\* \* \* \* \*